United States Patent
Yoo et al.

(10) Patent No.: US 9,827,985 B2
(45) Date of Patent: Nov. 28, 2017

(54) SYSTEM AND METHOD FOR AUTONOMOUS NAVIGATION OF VEHICLE

(71) Applicant: HYUNDAI MOTOR COMPANY, Seoul (KR)

(72) Inventors: Su Jung Yoo, Incheon (KR); Ji Hyun Yoon, Seoul (KR); Min Yong Shin, Seoul (KR); Hoi Won Kim, Gwacheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 293 days.

(21) Appl. No.: 14/667,254

(22) Filed: Mar. 24, 2015

(65) Prior Publication Data

US 2016/0144859 A1 May 26, 2016

(30) Foreign Application Priority Data

Nov. 21, 2014 (KR) .................... 10-2014-0163621

(51) Int. Cl.
*B60W 30/095* (2012.01)
*G05D 1/00* (2006.01)
*B60W 30/09* (2012.01)

(52) U.S. Cl.
CPC ........ *B60W 30/0956* (2013.01); *B60W 30/09* (2013.01); *B60W 2420/52* (2013.01); *B60W 2550/304* (2013.01); *B60W 2550/408* (2013.01)

(58) Field of Classification Search
CPC .......... B60W 30/095; B60W 30/0953; B60W 30/0956; B60W 30/18163; B60W 50/0097; B60W 2550/20; G08G 1/166
See application file for complete search history.

(56) References Cited

U.S. PATENT DOCUMENTS

| 7,729,857 | B2 | 6/2010 | Mudalige et al. | |
|---|---|---|---|---|
| 2012/0265431 | A1* | 10/2012 | Hayakawa | ............... B60T 7/22 701/301 |
| 2013/0253815 | A1* | 9/2013 | Orfila | ..................... G08G 1/166 701/301 |

(Continued)

FOREIGN PATENT DOCUMENTS

| EP | 2208654 A1 | 7/2010 |
|---|---|---|
| JP | 2010-070047 A | 4/2010 |

(Continued)

*Primary Examiner* — Genna M Mott
*Assistant Examiner* — Charles J Han
(74) *Attorney, Agent, or Firm* — McDermott Will & Emery LLP (57) ABSTRACT

A system and method for performing autonomous navigation of a vehicle are disclosed, which recognize a possibility of collision risk through path estimation of a target vehicle, and generate an autonomous navigation path. The autonomous navigation system for a vehicle includes: a target-vehicle information detection unit configured to detect traveling information of a target vehicle; and a path generation unit configured to estimate movement of the target vehicle on the basis of the information received from the target-vehicle information detection unit, calculate a collision risk value by recognizing a possibility of collision risk between an ego-vehicle and the target vehicle, and generate an autonomous navigation path of the ego-vehicle.

9 Claims, 9 Drawing Sheets (56) References Cited

U.S. PATENT DOCUMENTS

2014/0142799 A1\* 5/2014 Ferguson ............... G05D 1/00
 701/23
2015/0073662 A1\* 3/2015 Schmudderich; Jens
 ............................. B62D 6/00
 701/41

FOREIGN PATENT DOCUMENTS

| JP | 2011-086139 A | 4/2011 |
| KR | 10-0954232 B1 | 4/2010 |
| KR | 10-2013-0108200 A | 10/2013 |
| KR | 10-2014-0066301 A | 6/2014 |

\* cited by examiner

SYSTEM AND METHOD FOR AUTONOMOUS NAVIGATION OF VEHICLE

CROSS-REFERENCE TO RELATED APPLICATION

The priority of Korean patent application No. 10-2014-0163621 filed on Nov. 21, 2014, the disclosure of which is hereby incorporated in its entirety by reference, is claimed.

BACKGROUND OF THE INVENTION

The present invention relates to a system and method for performing autonomous navigation of a vehicle, and more particularly to a technology for recognizing a possibility of collision risk through path estimation of a target vehicle, and generating an autonomous navigation path.

Recently, with rapid development in industry, the number of vehicle users has been rapidly increased. As a vehicle usage time becomes longer, vehicles are more important to modern life. Vehicle drivers usually prefer to stay in a more comfortable environment and have a more convenient life, and thus many vehicle developers and companies have been conducting intensive research in order to increase freight transportation capability and to provide vehicle drivers with a more comfortable life.

Therefore, various systems for protecting vehicle users and passengers, assisting vehicle driving, and improving ride comfort, have been embedded in vehicles.

In recent times, many developers and companies are conducting intensive research into an improved vehicle system configured to allow a vehicle to be autonomously driven instead of being directly driven by a vehicle driver, and are also conducting intensive research into an unmanned vehicle that recognizes a peripheral state and a vehicle state using electric sensors capable of substituting for human senses so that the unmanned vehicle can be autonomously driven.

Various technologies are needed for unmanned vehicles in such a manner that the unmanned vehicles can accomplish given tasks in various environments. However, the most basic technology is an autonomous navigation technology in which a vehicle can autonomously travel to a destination through a safe and optimum path for a shorter time.

The autonomous navigation system for a vehicle recognizes a peripheral situation and a vehicle state while the vehicle travels to a predetermined destination without using driver intention, resulting in implementation of an autonomous navigation of the vehicle.

The autonomous navigation system may include an obstacle recognition step, an obstacle decision step, a traveling-path generation step, and a vehicle control step. The traveling-path generation step has to generate an obstacle avoidance path in real time by detecting a variation of the obstacle, and also has to generate a path in which mechanical movement characteristics of the vehicle is reflected.

In order to more stably perform autonomous navigation on the actual road, a method for recognizing the possibility of collision risk between static and dynamic objects located in a peripheral region is of importance to vehicles.

For this purpose, a hierarchical collision detection scheme can be easily implemented, which estimates paths of a target vehicle and a peripheral vehicle (i.e., a target vehicle), represents a vehicle position for each unit time (e.g., a few seconds) in the form of a polygon, and recognizes the possibility of vehicle collision risk, so that the hierarchical collision detection scheme has been widely used throughout the world. However, according to the above-mentioned hierarchical collision detection scheme, if a predicted path of a moving object is incorrect, the accuracy of collision detection may be deteriorated.

If it is impossible to predict/reflect movement of a peripheral vehicle (i.e., a target vehicle) when the autonomous navigation system generates a traveling path, the path generation process cannot be stably performed, resulting in higher possibility of collision risk.

SUMMARY OF THE INVENTION

Various embodiments of the present invention are directed to providing a system and method for autonomous navigation of a vehicle that substantially obviate one or more problems due to limitations and disadvantages of the related art.

An embodiment of the present invention relates to a technology for implementing an autonomous navigation system for a vehicle in real time using a hierarchical collision detection scheme, such that the autonomous navigation system predicts movement of a peripheral vehicle (i.e., a target vehicle) on the basis of information regarding the size, position, a departure angle, a speed, etc. of the target vehicle, determines the possibility of vehicle collision risk, and thus generates a stable path in various environments according to the determined result.

In accordance with an aspect of the embodiment, an autonomous navigation system for a vehicle includes: a target-vehicle information detection unit configured to detect traveling information of a target vehicle; and a path generation unit configured to estimate movement of the target vehicle on the basis of the information received from the target-vehicle information detection unit, calculate a collision risk value by recognizing a possibility of collision risk between an ego-vehicle and the target vehicle, and generate an autonomous navigation path of the ego-vehicle.

In accordance with another aspect of the embodiment, an autonomous navigation method for a vehicle includes: detecting traveling information of a target vehicle; estimating movement of the target vehicle on the basis of information received from a target-vehicle information detection unit; and calculating a collision risk value by recognizing a possibility of collision risk between an ego-vehicle and the target vehicle, and generating an autonomous navigation path of the ego-vehicle.

It is to be understood that both the foregoing general description and the following detailed description of the present invention are exemplary and explanatory and are intended to provide further explanation of the invention as claimed.

DETAILED DESCRIPTION OF THE INVENTION

Reference will now be made in detail to the embodiments of the present invention, examples of which are illustrated in the accompanying drawings. Wherever possible, the same reference numbers will be used throughout the drawings and specification to refer to the same or like parts.

Figure 1:
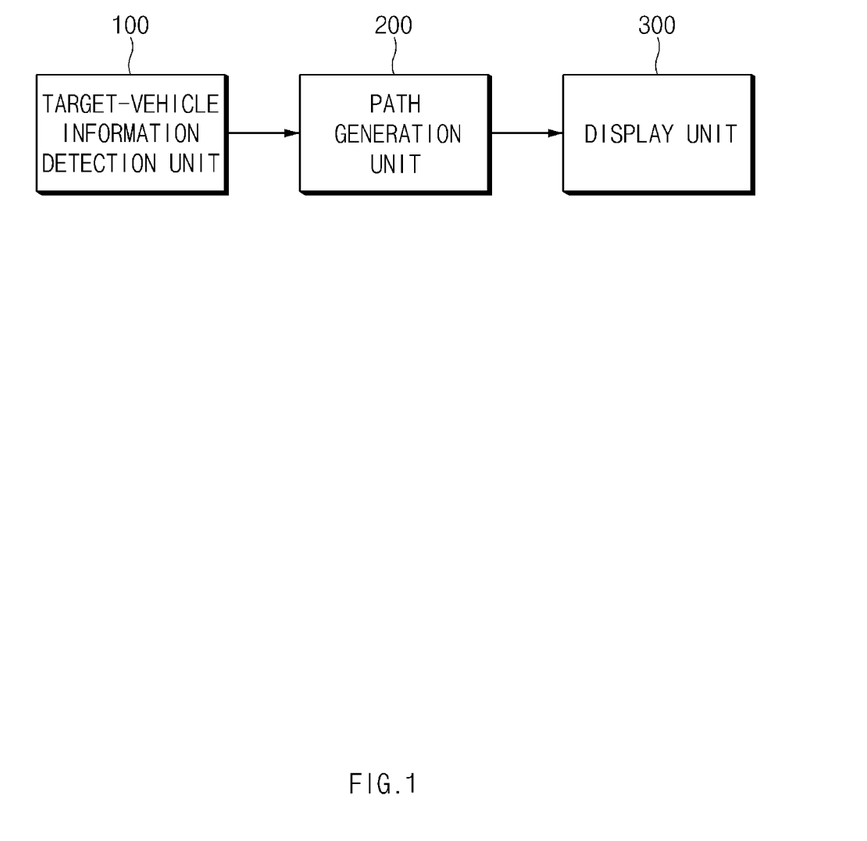
FIG. 1 is a block diagram illustrating an autonomous navigation system for a vehicle according to an embodiment of the present invention.

FIG. 1 is a block diagram illustrating an autonomous navigation system for a vehicle according to an embodiment of the present invention.

Referring to FIG. 1, the autonomous navigation system for a vehicle according to the embodiment may include a target-vehicle information detection unit 100, a path generation unit 200, and a display unit 300.

The target-vehicle information detection unit 100 may detect traveling information of a target vehicle, and output the detected traveling information to the path generation unit 200.

The target-vehicle information detection unit 100 may obtain traveling information of the target vehicle using Vehicle-to-everything (V2X) communication or other sensors such as a laser scanner, a radar, etc.

In this case, V2X technology may include Vehicle-to-Infrastructure (V2I) communication and Vehicle-to-Vehicle (V2V) communication. The target-vehicle information detection unit 100 may obtain information regarding the size, position, departure angle, speed, etc. of the target vehicle using sensors such as a laser scanner, a radar, etc.

The path generation unit 200 may receive detection information from the target-vehicle information detection unit 100. The path generation unit 200 may determine the presence or absence of lane change intention of the target vehicle using a probabilistic model. The path generation unit 200 may estimate a traveling path of the target vehicle, determine whether or not the target vehicle collides with an ego-vehicle, and thus generate a traveling path according to the determined result.

In addition, the display unit 300 may display a path generated by the path generation unit 200 thereon.

As described above, the path generation unit 200 may use a probabilistic model ($P_{LC}$) to determine the presence or absence of lane change intention. The probabilistic model (PLC) may be represented by the following equation 1.

$$P_{LC} = \frac{1}{1 + \exp(k_d d_{Target,LC} + k_\theta \theta_{Target,LC} V_{Target,Speed})} \quad \text{[Equation 1]}$$

Figure 2:
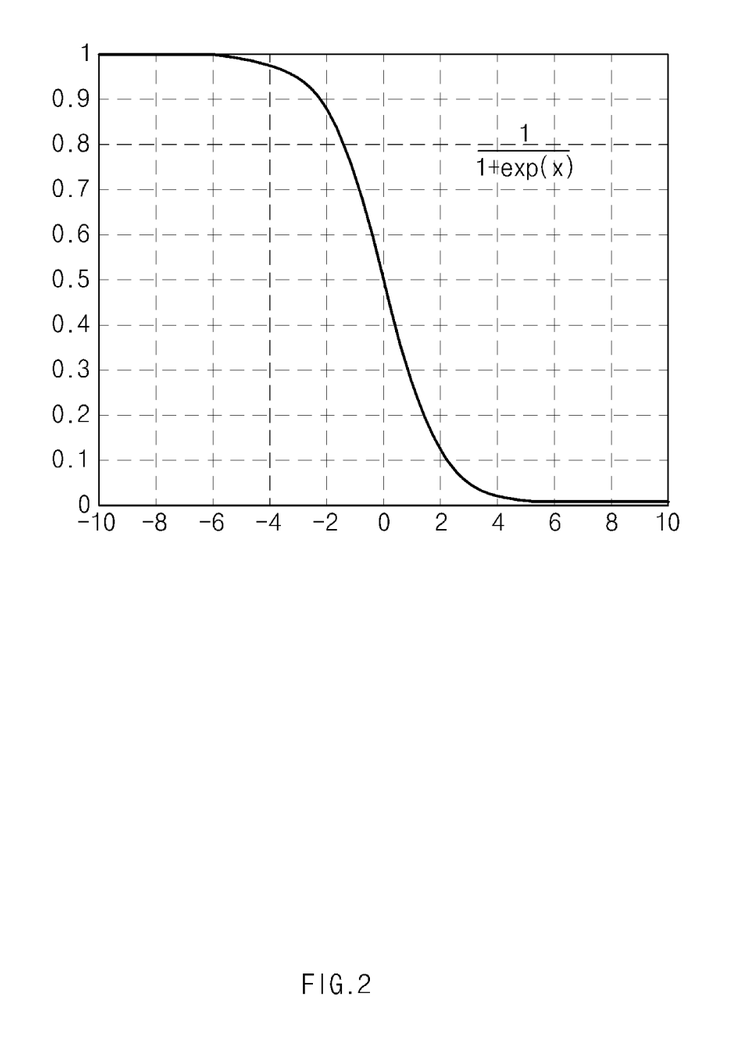
FIGS. 2 to 8 illustrate operations of a path generation unit shown in FIG. 1.

The value of the probabilistic model ($P_{LC}$) expressed by Equation 1 may be virtualized in FIG. 2. For the sake of explanation, the sum of ($K_d d_{Target,LC}$) and ($K_\theta \theta_{Target,LC} V_{Target,Speed}$) is simplified by x in FIG. 2. If a value of x is set to zero "0", the probabilistic model ($P_{LC}$) value is denoted by a value of ½. As x is gradually lower than zero "0", the probabilistic model ($P_{LC}$) value is converged into the value of 1. As x is gradually higher than zero "0", the probabilistic model ($P_{LC}$) value is converged into zero "0".

In Equation 1, $K_d$ and $K_\theta$ may respectively denote weights for reflecting influence of a parameter indicating the speed of a target vehicle and influence of a parameter indicating a departure angle of the target vehicle. In addition, $V_{Target,Speed}$ may denote the speed of the target vehicle, A $\theta_{Target,LC}$ may denote a path difference between the target vehicle and an ego-vehicle, and $d_{Target,LC}$ may denote an offset from the center part of the traveling lane of the target vehicle.

The above-mentioned path difference ($\theta_{Target,LC}$) and the above-mentioned target-vehicle offset ($d_{Target,LC}$) may be represented by the following equation 2.

$$\theta_{Target,LC} = \text{sign}(d_{Target,Offset})(\theta_{Target,HA} - \theta_{Path,HA})$$

$$d_{Target,LC} = |d_{Target,Offset}| - W_{LaneWidth} \quad \text{[Equation 2]}$$

In Equation 2, $W_{LaneWidth}$ may denote a width of the traveling lane. In addition, the path generation unit 200 may search for the nearest point to the current ego-vehicle position on the basis of the target-vehicle position. In order to search for the nearest point on the current traveling path of the ego-vehicle using "Quadratic Minimization" and "Newton's Method" theories. The path generation unit 200 may calculate the position, departure angle, and curvature of the current ego-vehicle on the basis of a road information model.

If an offset from the target vehicle to the ego-vehicle traveling path and a departure angle between the target vehicle and the ego-vehicle are calculated using the above-mentioned information, the path difference ($\theta_{Target,LC}$) and the target-vehicle offset ($d_{Target,LC}$) can be calculated.

Figure 3:
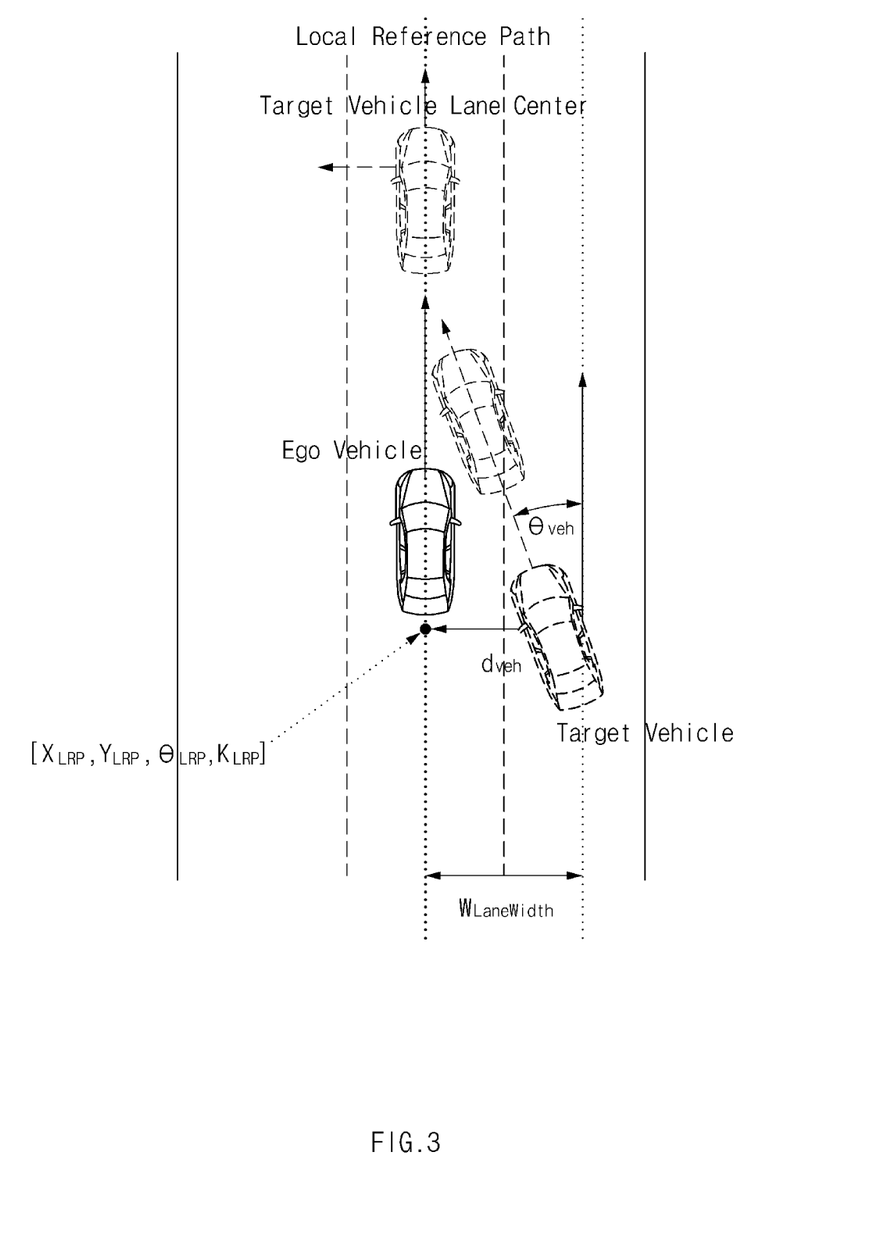

Therefore, a function for predicting a lane change intention of the target vehicle may be defined as shown in FIG. 3, and has the following characteristics.

That is, assuming that the path difference ($\theta_{Target,LC}$) and the target-vehicle offset ($d_{Target,LC}$) are greater than zero "0", the probabilistic model ($P_{LC}$) becomes zero "0". Therefore, it may be predicted that a traveling lane of the target vehicle will be changed to an opposite direction of the ego-vehicle traveling direction.

Assuming that the path difference ($\theta_{Target,LC}$) and the target-vehicle offset ($d_{Target,LC}$) are lower than zero "0", the probabilistic model ($P_{LC}$) becomes the value of "1". Therefore, it may be predicted that a traveling lane of the target vehicle will be changed to the traveling-lane direction of the ego-vehicle.

Assuming that the path difference ($\theta_{Target,LC}$) and the target-vehicle offset ($d_{Target,LC}$) are set to zero "0", the probabilistic model ($P_{LC}$) becomes the value of "½". Therefore, it may be predicted that the traveling lane of the target vehicle will be unchanged.

Therefore, if the probabilistic model ($P_{LC}$) is greater than a predetermined threshold value ($TH_{Upper}$), the value of "1" is input to a lane change flag ($\delta$). As a result, it is determined that a traveling lane of the target vehicle will be changed to a traveling lane of the autonomously-navigating vehicle (i.e., the ego-vehicle), resulting in formation of an optimum path.

On the other hand, if the probabilistic model ($P_{LC}$) is less than a predetermined threshold value ($TH_{Lower}$), a traveling lane will be changed to the opposite direction, so that the value of "−1" is input to a lane change flag ($\delta$). In addition, the probabilistic model ($P_{LC}$) is in the range from the threshold value ($TH_{Upper}$) to the other threshold value ($TH_{Lower}$), the value of "0" is input to the lane change flag ($\delta$). As a result, it is determined that a traveling lane of the autonomously navigating vehicle will be unchanged.

The lane change decision based on the lane change flag ($\delta$) may be represented by the following equation 3.

$$\delta(t) = \begin{cases} 1, & \text{if } P_{LC} > TH_{upper} \\ -1, & \text{if } P_{LC} < TH_{lower} \\ 0, & \text{otherwise} \end{cases} \quad \text{[Equation 3]}$$

As can be seen from Equation 3, the path generation unit 200 may determine the probabilistic model ($P_{LC}$) on the basis of the highest threshold value ($TH_{Upper}$) and the lowest threshold value ($TH_{Lower}$). In this case, the path generation unit 200 may use a hysteresis range in which a previous value can be maintained in a specific range, so that the path generation unit 200 can prevent sudden change (chattering) of the corresponding value at a threshold value.

In addition, if the lane change intention decision of the target vehicle is completed, the path generation unit 200 may generate an estimated path in consideration of the size of target vehicle.

Figure 4:
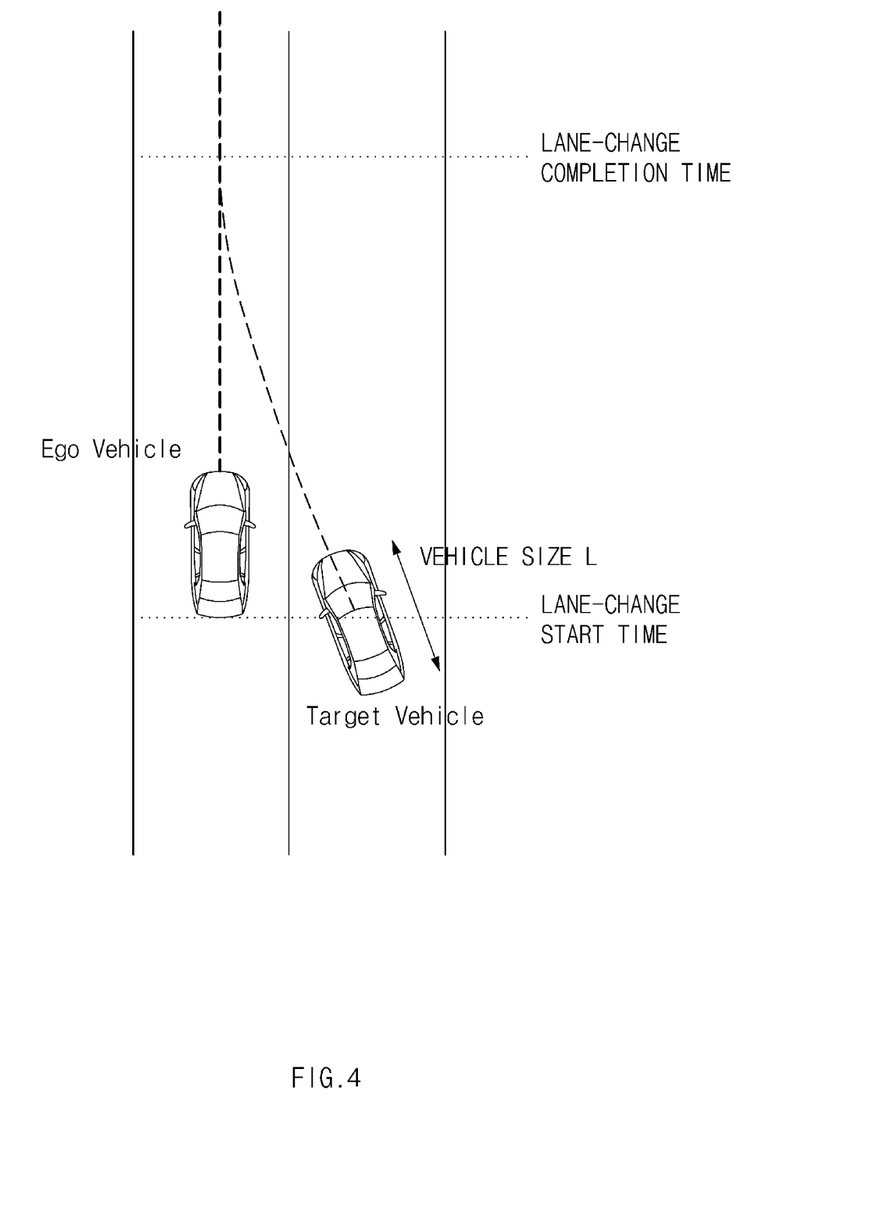

In this case, as the target vehicle gradually increases in size (such as a bus, a truck, etc.), the lane change time and path are also increased, so that the path of the target vehicle is estimated on the basis of the increased lane change time and path. Therefore, as shown in FIG. 4, the lane change completion time ($T_0$) may be changed according to the vehicle size.

The lane change completion time ($T_0$) may be represented by the following equation 4.

$$T_0 = k_L L \quad \text{[Equation 4]}$$

$$\sqrt{\frac{2\pi y_{final}}{a_{lat.max}}} \leq T_0 \leq t_{max}$$

$$\begin{pmatrix} a_{lat.max}\text{: maximum lateral acceleration causing} \\ \text{no sense of incompatilbility} \\ t_{max}\text{: maximum lane change time} \end{pmatrix}$$

In Equation 4, $a_{lat.max}$ may denote a maximum lateral acceleration causing no sense of incompatibility, and $t_{max}$ may denote a maximum lane change time.

Figure 5:
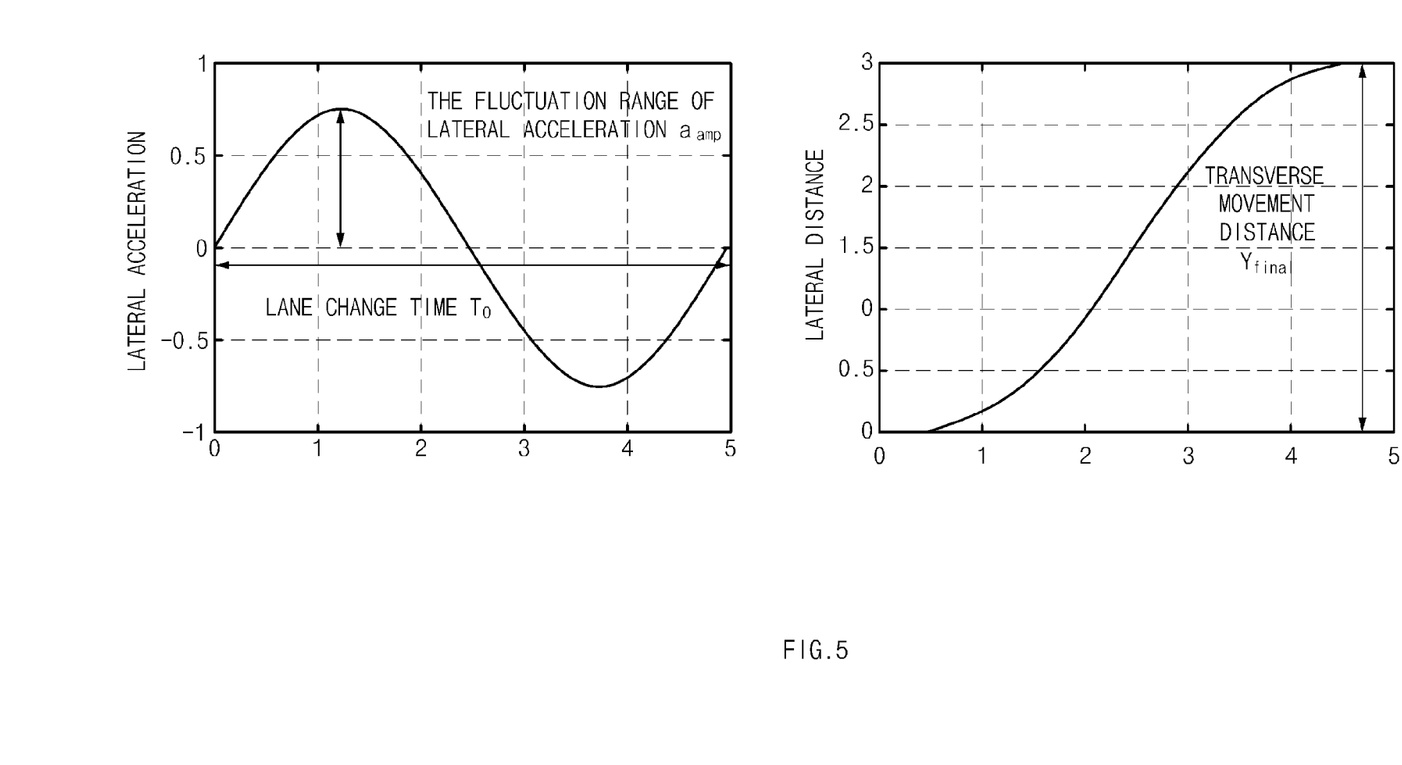

A target-vehicle lateral acceleration corresponding to the lane change time ($T_0$) of the target vehicle, and a target-vehicle lateral distance corresponding to a transverse movement distance ($y_{final}$) are shown as graphs of FIG. 5.

Figure 6:
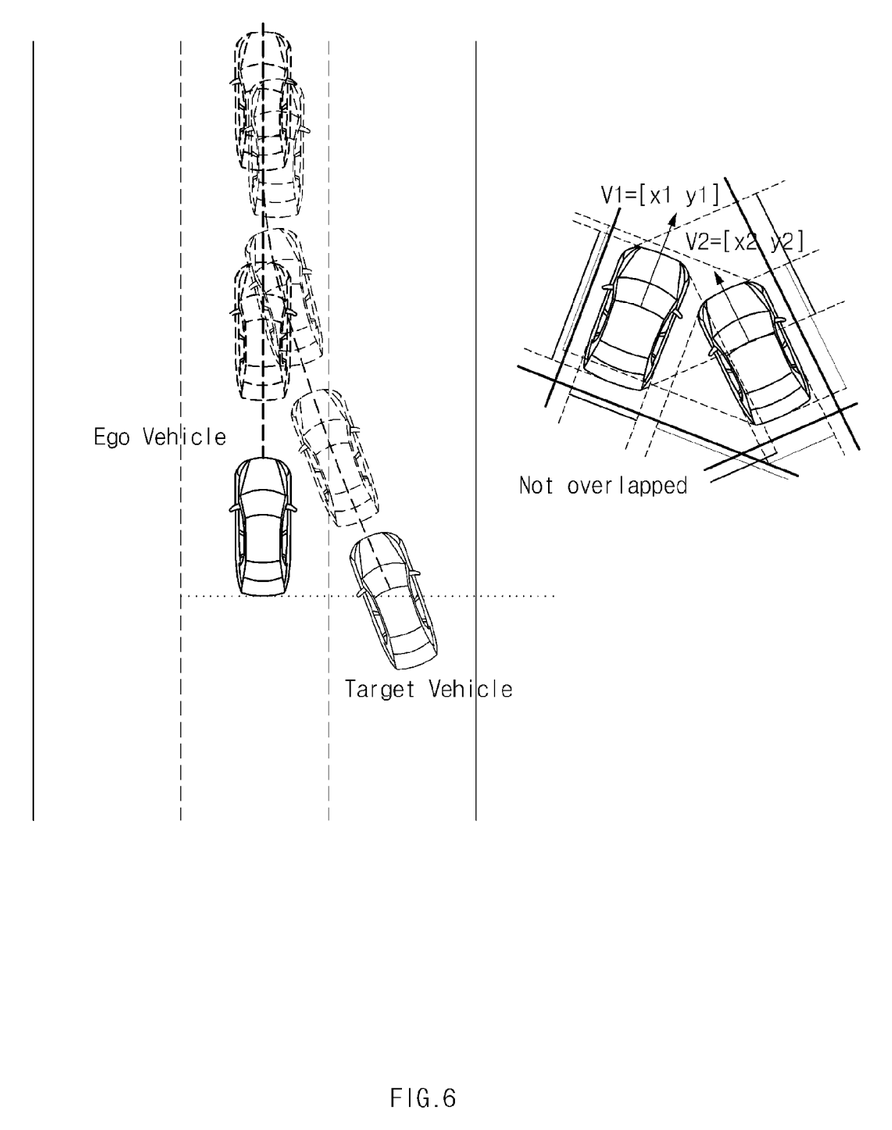

In addition, as shown in FIG. 6, if the path of the target vehicle is estimated, the path generation unit 200 estimates the position of the target vehicle in units of a specific time (e.g., t seconds), so that the path generation unit 200 recognizes the possibility of vehicle collision risk according to the estimated result. In this case, the ego-vehicle path may be defined as V1=[x1 y1], and the target-vehicle path may be defined as V2=[x2 y2].

For example, the ego-vehicle position and the target-vehicle position after lapse of a predetermined time (i.e., "t" seconds) may be estimated, and the possibility of collision risk between the ego-vehicle and the target vehicle may be decided on the basis of the above-mentioned vehicle positions. In this case, the shorter the time, the higher the possibility of vehicle collision risk. As a result, as the estimated collision time between the target vehicle and the ego-vehicle is gradually reduced, the possibility of vehicle collision risk is gradually increased.

Figure 7:
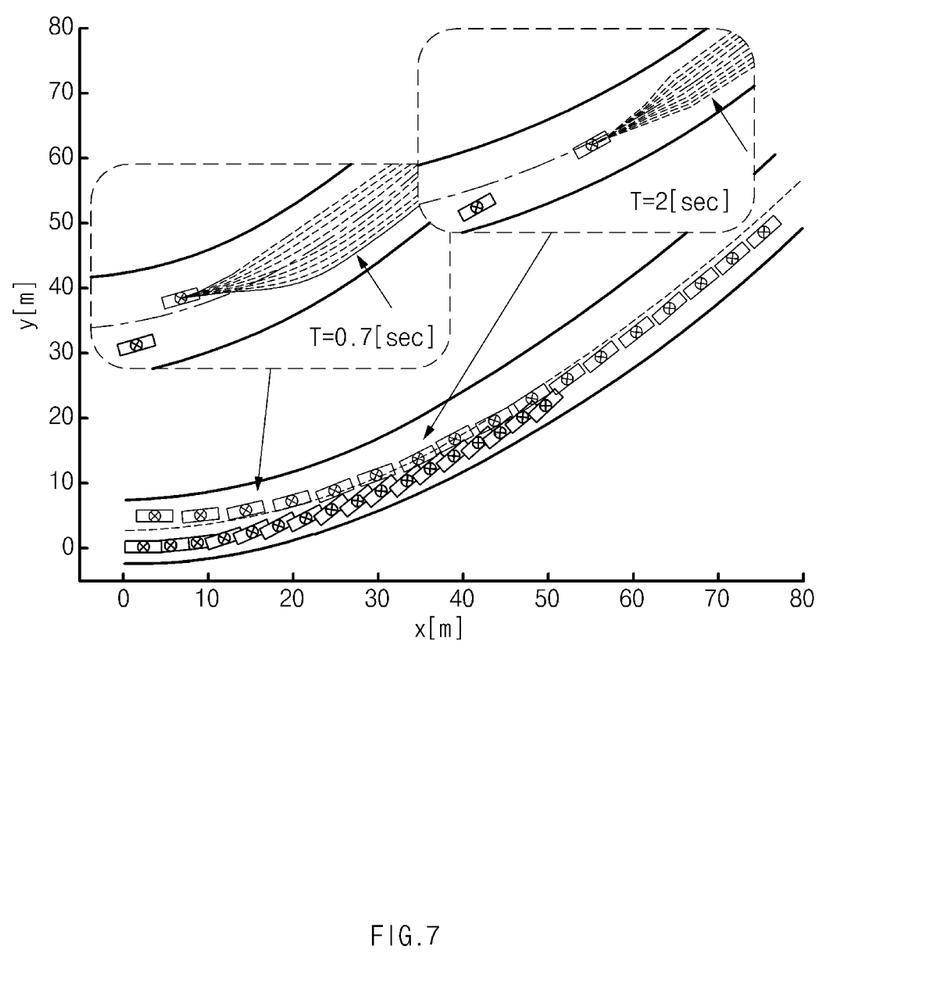
Figure 8:
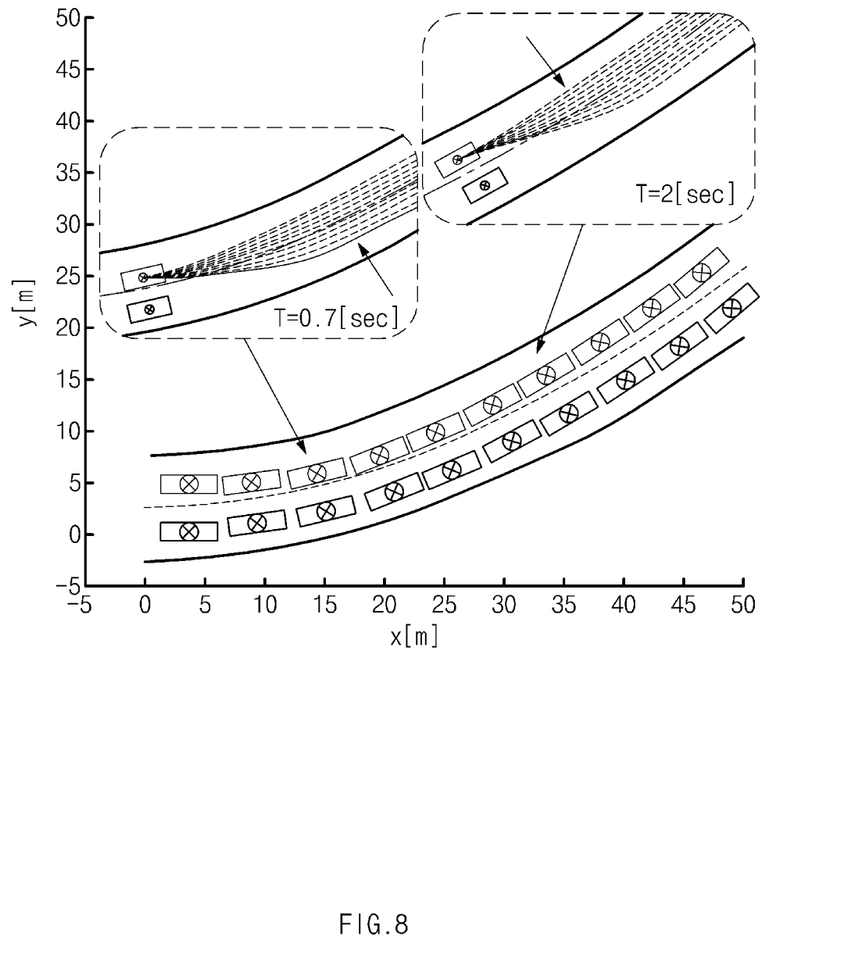

After deciding the possibility of collision risk between the ego-vehicle and the target vehicle, a specific path having the lowest possibility of collision risk is selected as shown in FIGS. 7 and 8, so that the ego-vehicle can travel on the selected path. The selected traveling path is displayed on the display unit 300, so that a vehicle driver can recognize the selected traveling path.

In other words, if there is no possibility of collision risk between the autonomously navigating vehicle (i.e., the ego-vehicle) and the target vehicle when the ego-vehicle attempts to change its own traveling path, the traveling lane of the ego-vehicle is changed as shown in FIG. 7. On the other hand, if there is a high possibility of collision risk between the autonomously navigating vehicle (i.e., the ego-vehicle) and the target vehicle when the ego-vehicle attempts to change its won traveling path, the traveling lane of the ego-vehicle is unchanged and returns to an original traveling path as shown in FIG. 8.

The above-mentioned embodiment estimates the movement of the target vehicle on the basis of traveling information of the target vehicle, and determines the possibility of collision risk, so that a stable traveling path can be generated according to the determined result.

Figure 9:
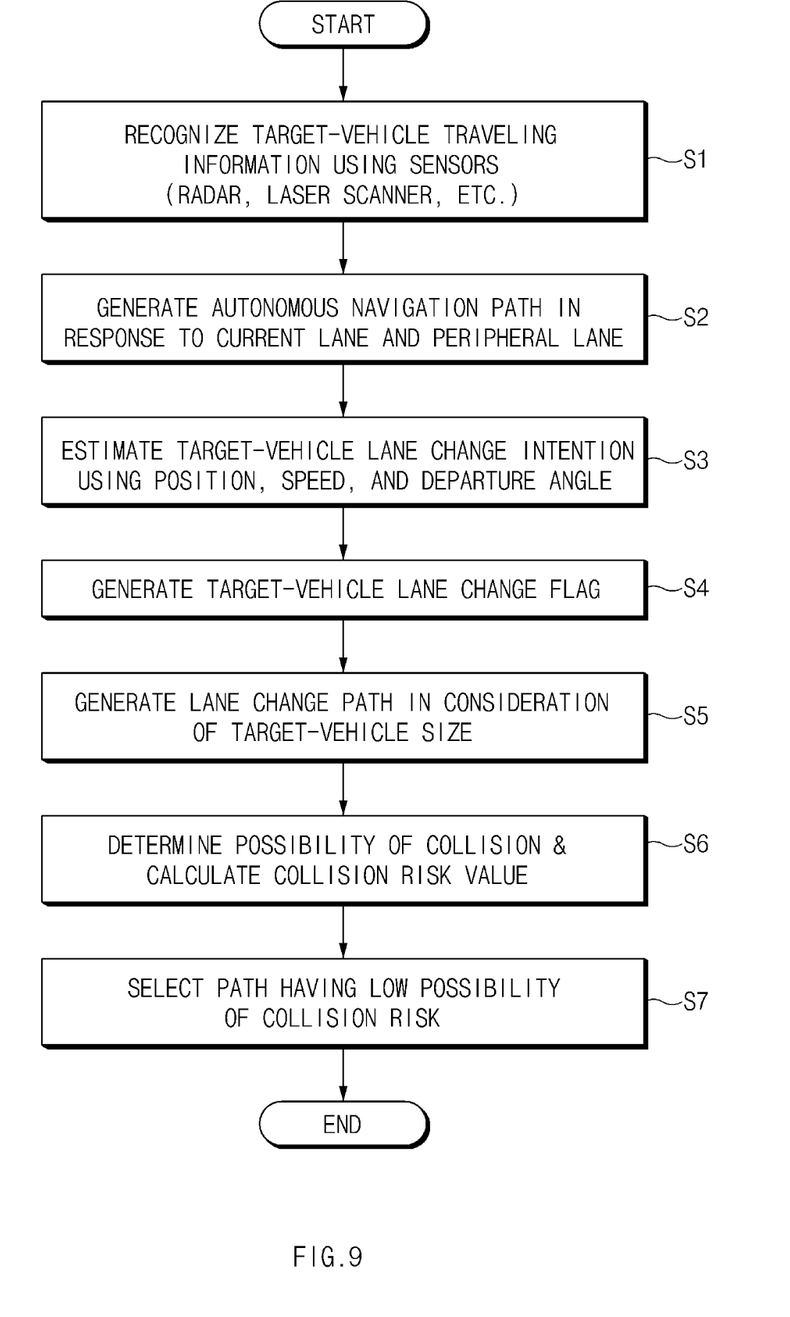
FIG. 9 is a flowchart illustrating an autonomous navigation method for a vehicle according to an embodiment of the present invention.

FIG. 9 is a flowchart illustrating an autonomous navigation method for a vehicle according to an embodiment of the present invention.

Referring to FIG. 9, the target-vehicle information detection unit 100 may recognize traveling information of the target vehicle using sensors, and may output the recognized traveling information to the path generation unit 200 in step S1.

Thereafter, the path generation unit 200 may receive the detected information from the target-vehicle information detection unit 100, and may generate a path of the autonomously navigating vehicle in response to a current lane and a peripheral lane in step S2.

That is, the path generation unit 200 may estimate the lane change intention of the target vehicle using information regarding the position, speed, departure angle, etc. of the target vehicle in step S3.

Thereafter, the path generation unit 200 may generate a lane change flag of the target vehicle in step S4. The path generation unit 200 may generate a lane change path in consideration of the size of the target vehicle in step S5.

Subsequently, the path generation unit 200 may recognize the possibility of collision risk between the ego-vehicle and the target vehicle, and may calculate a value indicating the collision risk in step S6. The path generation unit 200 may select the lowest possibility of collision risk, and may generate a traveling path of the autonomously navigating vehicle in step S7.

As is apparent from the above description, the system and method for performing autonomous navigation of a vehicle according to the embodiments predicts movement of a peripheral vehicle (i.e., a target vehicle) on the basis of information regarding the size, position, a departure angle, a speed, etc. of a peripheral angle, recognizes the possibility of vehicle collision, and thus generates a stable path in various environments according to the determined result.

The above-mentioned embodiments are merely exemplary for better understanding of the present invention, and the scope of the present invention is not limited thereto. For example, a single component may be divided into two or more components, or two or more components may be combined into a single component as needed.

What is claimed is:
1. An autonomous navigation system for a vehicle, comprising:
    a sensor configured to detect traveling information of a target vehicle; and
    a processor configured to estimate movement of the target vehicle on the basis of the information received from the sensor, calculate a collision risk value by recognizing a possibility of collision risk between an ego-vehicle and the target vehicle, and generate an autonomous navigation path of the ego-vehicle,
    wherein the processor determines a lane change intention of the target vehicle using a lane-change-intention probabilistic model indicating the lane change intention, and estimates a traveling path of the target vehicle, and wherein the processor changes a lane-change completion time of the target vehicle according to a size of the target vehicle.

2. The autonomous navigation system according to claim 1, wherein the traveling information of the target vehicle is detected using one of V2X (vehicle-to-everything) communication, a laser scanner, and a radar.

3. The autonomous navigation system according to claim 1, wherein the sensor detects at least one of a size, a position, a departure angle, and a speed of the target vehicle.

4. The autonomous navigation system according to claim 1, wherein the lane-change-intention probabilistic model is established by defining weights for reflecting influence of speed of the target vehicle and heading parameters of the target vehicle and the ego-vehicle, and by defining a speed of the target vehicle, a path difference between the target vehicle and the ego-vehicle, and an offset from a center part of a traveling lane.

5. The autonomous navigation system according to claim 1, wherein the processor searches for the nearest point to a current traveling path of the ego-vehicle measured from the current position of the ego-vehicle, and thus calculates a position, a path-departure angle, and curvature information using road information modeling.

6. An autonomous navigation method for a vehicle, comprising:
   detecting traveling information of a target vehicle;
   estimating a movement of the target vehicle on the basis of information received from a sensor; and
   calculating a collision risk value by recognizing a possibility of collision risk between an ego-vehicle and the target vehicle, and generating an autonomous navigation path of the ego-vehicle,
   wherein the step of estimating a movement of the target vehicle includes:
      determining a lane change intention of the target vehicle using a lane-change-intention probabilistic model indicating the lane change intention;
      generating a lane change flag of the target vehicle; and
      estimating a lane change path in consideration of a size of the target vehicle,
   wherein the step of estimating a lane change path includes changing a lane-change completion time of the target vehicle according to the size of the target vehicle.

7. The autonomous navigation method according to claim 6, wherein the traveling information of the target vehicle includes at least one of a size, a position, a departure angle, and a speed of the target vehicle.

8. The autonomous navigation method according to claim 6, wherein the lane-change-intention probabilistic model is established by defining weights for reflecting influence of speed of the target vehicle and heading parameters of the target vehicle and the ego-vehicle, and by defining a speed of the target vehicle, a path difference between the target vehicle and the ego-vehicle, and an offset from a center part of a traveling lane.

9. The autonomous navigation method according to claim 6, wherein the step of estimating a movement of the target vehicle includes:
   If a value of the lane-change-intention probabilistic model is greater than a first threshold value, inputting a first value to a lane change flag, and determining that a traveling lane of the target vehicle is changed to a lane of the ego-vehicle;
   If a value of the lane-change-intention probabilistic model is less than a second threshold value, inputting a second value to the lane change flag, and determining that a traveling lane of the target vehicle is changed to an opposite lane of the ego-vehicle traveling path; and
   If a value of the lane-change-intention probabilistic model is between the first threshold value and the second threshold value, inputting a third value to the lane change flag, and determining that a traveling lane of the target vehicle is unchanged.

\* \* \* \* \*